United States Patent
Tang (10) Patent No.: US 10,527,517 B2
(45) Date of Patent: Jan. 7, 2020

(54) DEVICES FOR TESTING AXIAL FANS

(71) Applicant: Hewlett Packard Enterprise Development LP, Houston, TX (US)

(72) Inventor: Punan Tang, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 99 days.

(21) Appl. No.: 15/715,838

(22) Filed: Sep. 26, 2017

(65) Prior Publication Data
US 2019/0094105 A1 Mar. 28, 2019

(51) Int. Cl.
*G01M 7/02* (2006.01)
*G01H 1/00* (2006.01)
*G01M 1/22* (2006.01)

(52) U.S. Cl.
CPC .......... *G01M 7/025* (2013.01); *G01H 1/003* (2013.01); *G01M 1/22* (2013.01)

(58) Field of Classification Search
CPC ........ G01M 7/025; G01M 7/027; G01M 1/22; G01M 13/028; G01M 99/005
USPC ...... 73/579, 660, 593, 861.85, 432.1, 865.9; 702/56
See application file for complete search history.

(56) References Cited

U.S. PATENT DOCUMENTS

| | | | |
|---|---|---|---|
| 4,807,718 A * | 2/1989 | Lotz | F04D 29/668 181/202 |
| 7,481,116 B1 | 1/2009 | Osborn | |
| 8,162,595 B2 | 4/2012 | Zwinger et al. | |
| 8,783,117 B2 | 7/2014 | Chang | |
| 9,255,833 B2 | 2/2016 | Satterfield | |
| 2007/0288181 A1 | 12/2007 | Kuo et al. | |
| 2013/0167657 A1* | 7/2013 | Chang | F04D 27/001 73/861.85 |
| 2014/0190261 A1* | 7/2014 | Satterfield | G01H 1/003 73/579 |

OTHER PUBLICATIONS

Fulltech Electric Co., Ltd.; "Vibration Test"; printed from: http://www.fulltech.com.tw/Contents.aspx?language=en-US&mid=5 on Sep. 11, 2017; 3 pages.

* cited by examiner

*Primary Examiner* — Lisa M Caputo
*Assistant Examiner* — Rose M Miller
(74) *Attorney, Agent, or Firm* — Hewlett Packard Enterprise Patent Department (57) ABSTRACT

In some examples herein relate to a system for testing an axial fan, the system comprising a V-shaped seat to allocate the axial fan, the V-shaped seat comprises a first surface established on a top side of the V-shaped set, a second surface established on the top side of the V-shaped set. An intersection between the first surface and the second surface forms a V-shaped surface of 90 degrees to allocate the axial fan on the V-shaped seat and the V-shaped surface has sticky and resilient properties to fix the axial fan on the V-shaped surface.

11 Claims, 11 Drawing Sheets

DEVICES FOR TESTING AXIAL FANS

BACKGROUND

Testing of cooling fans can be in accordance with laboratory methods that can achieve accurate performance ratings. The testing can apply not only to the fan but also to the measurement components and test devices that permit reporting those results. The data can be measured by specific laboratory transducers and sensors for varying measurement ranges to accommodate differing maximum horsepower, pressure and speed to be measured.

BRIEF DESCRIPTION OF THE DRAWINGS

The following detailed description references the drawings, wherein.

DETAILED DESCRIPTION

A cooling fan can generate mechanical vibration in a system, as e.g. a storage system as a rack server. This mechanical vibration may degrade disk drive's operation performance or may cause them to fail. Cooling fans are main dynamics and disturbing sources that can cause vibration and acoustic noise to the storage system. With the increased thermal needs of the latest storage products, the cooling fan speed has been increased up to 80%. Hence, fan vibration has been considerably increased causing the storage system internal environment to be harsher to disk drives in comparison with previous implementations.

Hence, it is desirable to provide better vibration fans, and also the technical support to help suppliers to improve the designs. However, the efforts or progress has been suffered or slowed down due to the non-uniform vibration test standards and specifications and the lack of consistency among test methodologies across suppliers. The data provided by suppliers may be incomplete and less meaningful for controls of the system vibration. The problem even gets more complex while assessing different sizes of fans, which induces using different test device or methods.

Examples of the proposed solution addressed the requirements to develop a low cost, uniform test method for suppliers to use during the periods of product design and qualifications. The uniformity of test method was required to have the advantages in data consistency and precision, less complexity in design, simplification in setup and operation, robustness for fan sizes, and capability to be used for both vibration and acoustic tests. Examples of the proposed solution shown in the present disclosure meet the aforementioned requirements.

In contrast to this, prior solutions can be more complex in design, setup and in operation procedure. Prior solutions cost more to build and may be limited to fan size. Furthermore, they could not be used for acoustic tests in contrast to examples of the proposed solution that can be used to analyse the acoustic response of a cooling fan. Hence, examples of the proposed solution induces significant test cost impacts for a complete qualification process of vibration and acoustics, especially for different size of fans.

The present disclosure shows a system for precise measurement of mechanical vibration energy generated by an axial fan at any size. An axial fan can be defined as a type of a compressor that increases the pressure of the air flowing through it. The blades of the axial flow fans force air to move parallel to the shaft about which the blades rotate. In other words, the flow is axially in and axially out, linearly, hence their name. The system comprises a resonance free V-Shaped fan seating foundation and a dual tri-axial vibration data acquisition unit and a Pulse Width Modulator, PWM based fan speed controller. The system quantifies axial fan's mechanical dynamics using the method of multi-point vibration collections on fan case. The data is a direct scaling for the strength of fan's disturbing forces to server system or storage enclosures. The data collected by this system can have good correlation with system's vibration and acoustics performance, especially it can be useful for the designs or control of disk drive's operation environment in systems. Examples of the proposed system can be cost effective, simple in configuration and easy to operate. The system can be used for all other sizes of fan's vibration and acoustics assessments.

The system for testing comprises a resonance free V-Shaped solid support foundation, two elastic sheets with sticky surfaces, a dual tri-axial vibration data acquisition unit, and a PWM based fan speed controller. The two elastics sheets are firmly glued on two V surfaces of the foundation to provide the resilient seating conditions for the sample. The surfaces of the elastics sheets are treated to have sticky properties, which will securely hold the sample in position during high speed runs. The system for testing was designed to have V surfaces and large size of depth in order to fit the fans with different depths. The height of V-surfaces maximizes the mounting areas for the stability of sample, and provides the consistent boundary conditions to all types of fans.

In a first implementation, the system for testing can comprise two vibration sensors can be are attached on the fan cases to pick up the vibration at the prescribed locations. The vibration signals of two sensors are input to a vibration analyser for Root-Mean-Square, RMS and Power Spectral Density, PSD data analysis. A PWM based fan speed controller is connected to the test sample, and provides the power and speed control to sample. The vibration data is captured at a prescribed speed when fan sample runs in steady operation state.

In a second implementation the system for testing can comprise a mesh of microphones established as a mesh of acoustic sensors to enclose the axial fan allocated on the V-shaped seat and measure an acoustic response of the axial fan.

Figure 1A:
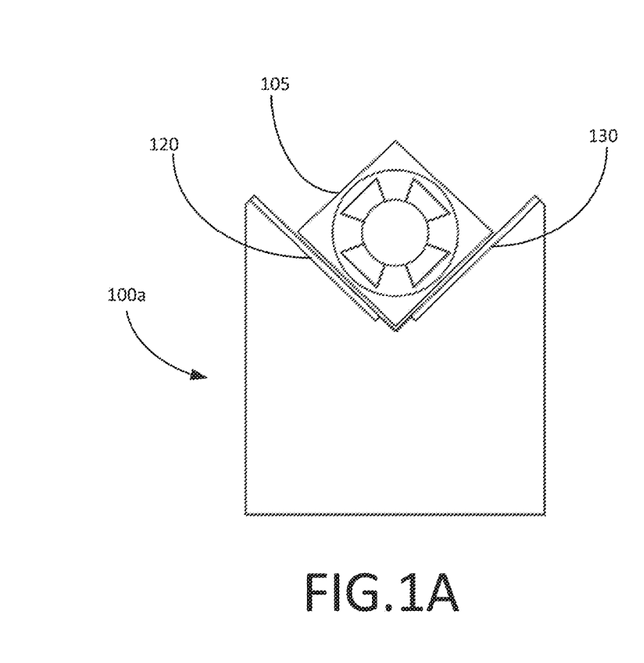
FIGS. 1A and 1B illustrate a first and a second example V-shaped seat for allocating an axial fan according to the present disclosure.

FIG. 1A shows a first example of a V-shaped seat 100a for allocating an axial fan 105 according to the present disclosure. The V-shaped seat 100a comprises a first surface 120 established on a top side of the V-shaped seat and a second surface 130 established on the top side of the V-shaped seat 100a. An intersection between the first surface 120 and the second surface 130 forms a V-shaped surface of 90 degrees to allocate the axial fan 105 on the V-shaped seat, and wherein the V-shaped surface has sticky and resilient properties to fix the axial fan 105 on the V-shaped surface.

Figure 1B:
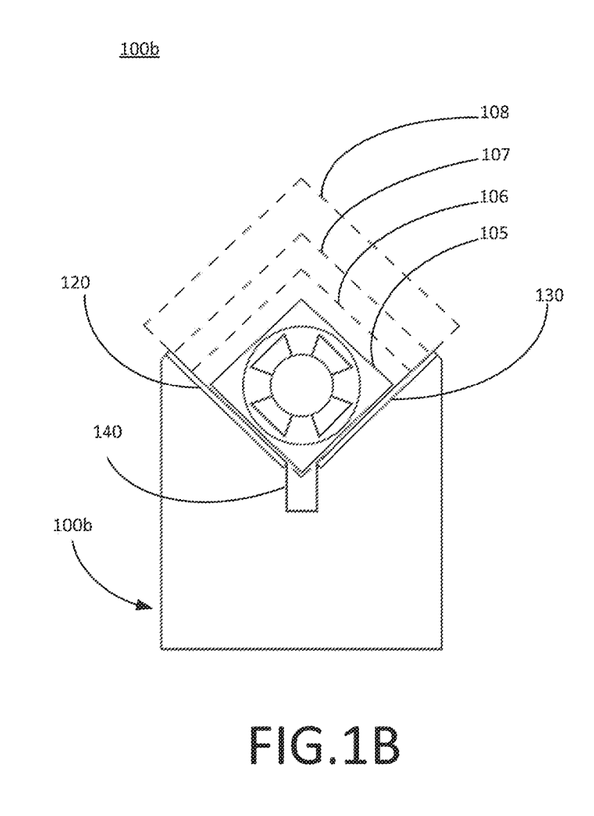

FIG. 1B shows a second example of a V-shaped seat 100b for allocating the axial fan 105 according to the present disclosure. The V-shaped seat 100b as well as the V-shaped seat 100a shown in FIG. 1A can allocate different sizes of fans. The fan 105 can have a size of 40 mm. In other implementations, the fan 105 could have a size of 60 mm represented by reference 106, a size of 80 mm represented by reference 107, and a size of 120 mm represented by reference 108. The examples V-shaped seats can be used for all other sizes of fan's vibration and acoustics assessments. The V-shaped seat 100b shown in FIG. 1B comprises a gap 140 established on the intersection between the first surface 120 and the second surface 130 to receive a part of the volume of the axial fan 105 to improve allocation of the axial fan 105 onto the V-shaped surface.

Figure 2:
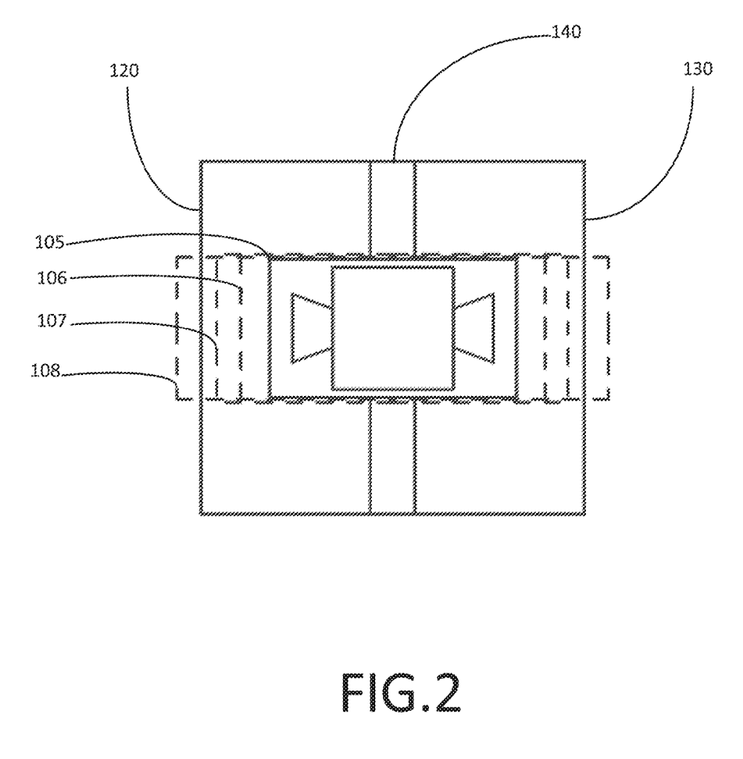
FIG. 2 illustrates a top view of an example V-shaped seat for allocating an axial fan according to the present disclosure.

FIG. 2 shows a top view of the second example V-shaped seat 100b for allocating an axial fan according to the present disclosure. References 105 to 108 shows different fan sizes that could allocate the V-shaped seat 110b. As previously mentioned, the fan 105 could have a size of 60 mm represented by reference 106, a size of 80 mm represented by reference 107, and a size of 120 mm represented by reference 108 or other sizes of fan's vibration and acoustics assessments.

Figure 3:
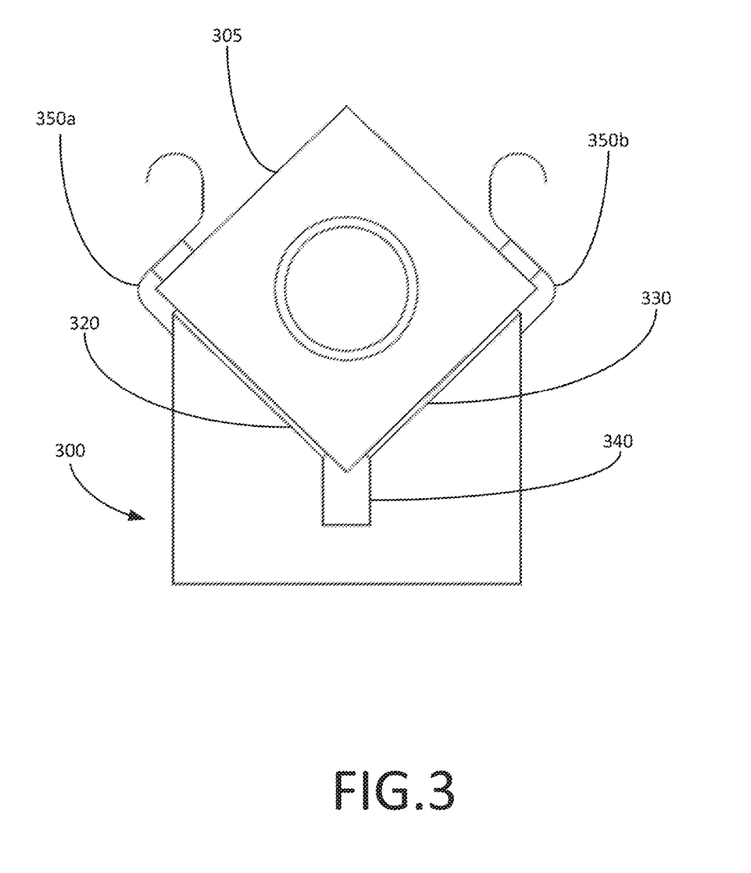
FIG. 3 illustrates an example V-shaped seat for allocating an axial fan according to the present disclosure.

FIG. 3 shows a V-shaped seat 300. The V-shaped seat 300 comprises a first surface 320 established on a top side of the V-shaped seat and a second surface 330 established on the top side of the V-shaped seat 300. An intersection between the first surface 320 and the second surface 330 forms a V-shaped surface of 90 degrees to allocate the axial fan 305 on the V-shaped seat, and wherein the V-shaped surface has sticky and resilient properties to fix the axial fan 305 on the V-shaped surface. Furthermore, the V-shaped seat 300 comprises two spring loaded clamps 350a and 350b to grip the axial fan 305.

Figure 4:
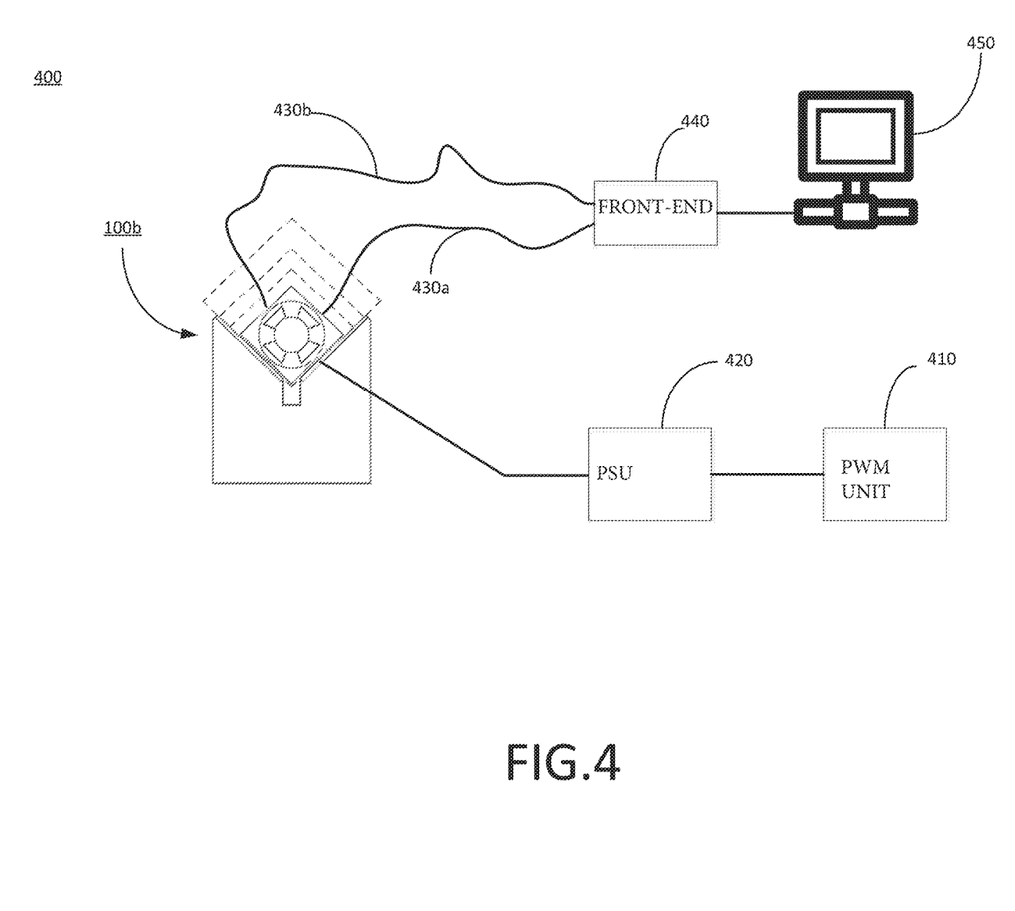
FIG. 4 illustrates an example system for testing an axial fan according to the present disclosure.

FIG. 4 illustrates an example system 400 for testing an axial fan and obtain a vibration response of the axial fan. The system 400 comprises the V-shaped seat 100b to allocate the axial fan previously shown in FIG. 1B. In other implementations the V-shaped seat 100a or the V-shaped seat 300 could be used in the example system 400. The system 400 comprises a power supply unit, PSU 420 to provide current to the axial fan. The PSU 420 can convert mains AC to low-voltage regulated DC power to power the axial fan. The system 400 comprises a PWM unit 410 to regulate the current provided to the axial fan. The PWM modulator 410 can generate an analogue signal that regulates the power supplied to the axial fan using a digital source which has a specific duty cycle frequency that can be selected by a user or operator.

The system 400 comprises at least two tri-axial vibration sensors 430a and 430b connected to the axial fan to measure a vibration response of the axial fan allocated on the V-shaped seat. Tri-axial vibration sensors can detect a misaligned coupling, electrical issues, unbalances, etc. Different positions on the bearing could provide a different frequency response. In this respect, the tri-axial vibration sensor can eliminate structural influences in the reading. The system can quantify axial fan's mechanical dynamics using the method of multi-point vibration collections on fan case. The vibration signals of the two sensors 430a and 430b can be input e.g. to a vibration analyser for Root-Mean-Square, RMS and Power Spectral Density, PSD data analysis.

The system 400 comprises a front-end connected to the at least two tri-axial vibration sensors to convert the vibration response to raw data. The front-end can use sensitive operational amplifiers, filters, and sometimes application-specific integrated circuits for the tri-axial vibration sensors to provide a measureable output as e.g. raw data to be used by a digital signal analyser represented by the computing device 450 to process and represent the raw data. The data collected by the system 400 can have good correlation with system's vibration and acoustics performance, especially it can be useful for the designs or control of disk drive's operation environment in systems.

Figure 5:
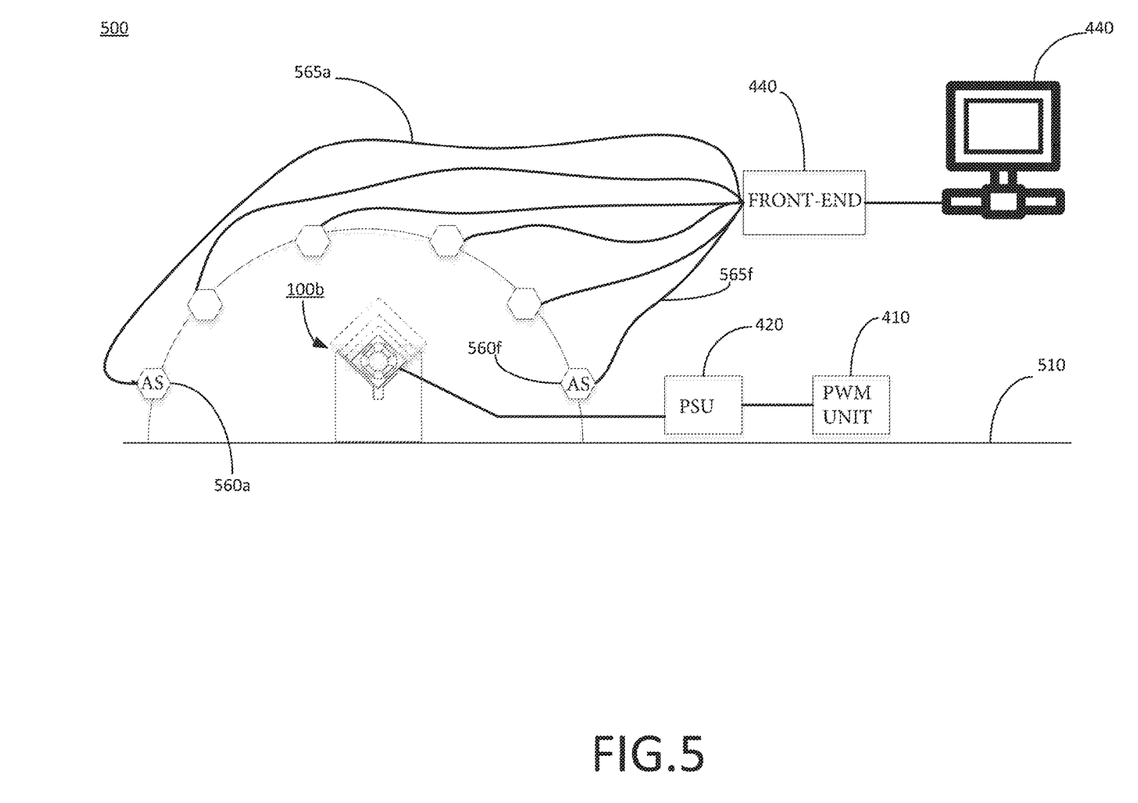
FIG. 5 illustrates another example system for testing an axial fan according to the present disclosure.

FIG. 5 illustrates an example system 400 for testing an axial fan and obtain an acoustic response of the axial fan. The system 500 comprises the V-shaped seat 100b established on a surface 510 to allocate the axial fan 100b previously shown in FIG. 1B. In other implementations the V-shaped seat 100a or the V-shaped seat 300 could be used in the example system 500 for obtaining an acoustic response of the axial fan. The system 500 comprises the power supply unit, PSU 420 to provide current to the axial fan. The system 500 comprises the PWM unit 410 to regulate the current provided to the axial fan.

Furthermore, the system 500 comprises a mesh of acoustic sensors 560a to 560f to enclose the axial fan allocated on the V-shaped seat 100b and measure an acoustic response of the axial fan. The mesh of acoustic sensors 560a to 560f are connected to the front-end 440 by cables 565a to 565f. Any other number of acoustic sensors could be used, e.g. 10, 15, 20, etc. The front-end 440 can convert the acoustic response of the axial fan to raw data that can be processed by the digital signal analyser comprised in the computing device 440 to represent the raw data associated with the acoustic response. In this particular example, the mesh of acoustics sensors 601a to 560f is a mesh of ultra-high sensitive microphones.

Figure 6:
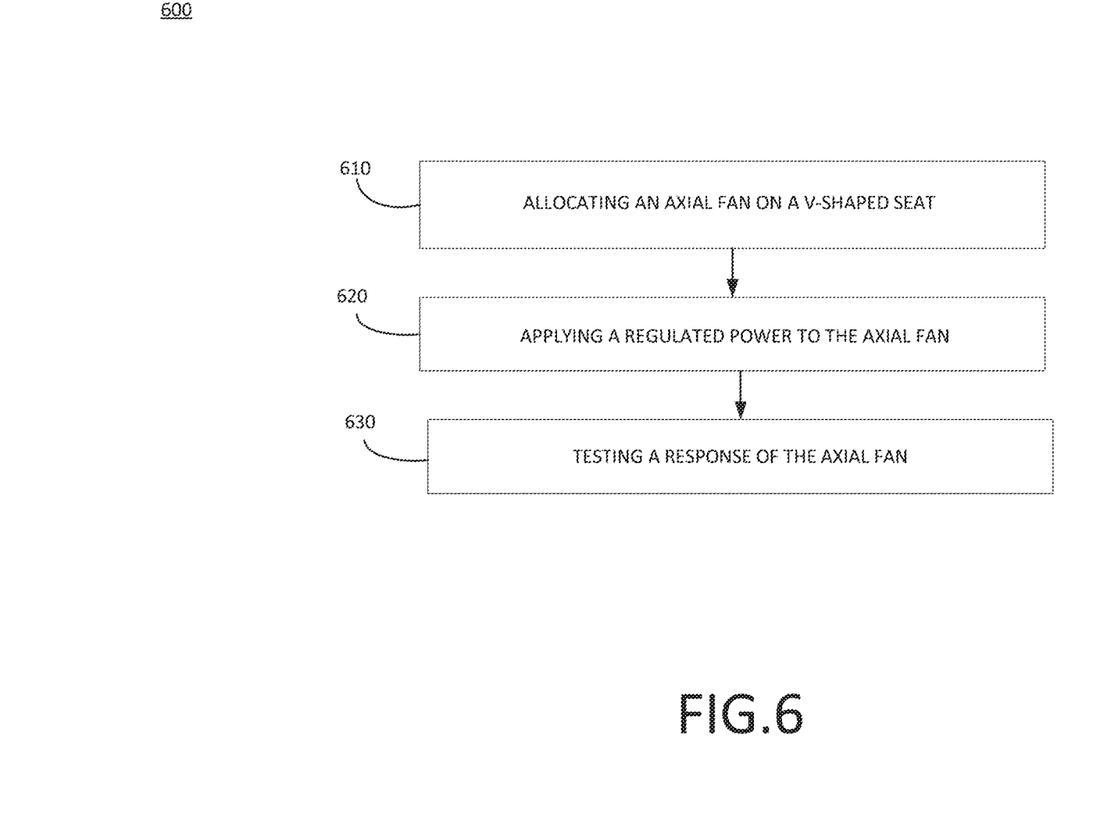
FIG. 6 illustrates a flowchart of an example method for testing an axial fan.

FIG. 6 shows a flowchart of an example method 600 for testing an axial fan. The example method 600 comprises a step 610 for allocating an axial fan on a V-shaped seat. The V-shaped seat comprises a first surface established on a top side of the V-shaped seat and a second surface established on the top side of the V-shaped seat. An intersection between the first surface and the second surface forms a V-shaped surface of 90 degrees to allocate the axial fan on the V-shaped seat and the V-shaped surface has sticky and resilient properties to fix the axial fan on the V-shaped surface.

Furthermore, the method 600 comprises a step 620 for applying a regulated power to the axial fan. This could be achieve by taking use of the power supply unit 420 and the pulse width modulator 410 unit shown in FIG. 4 and FIG. 5. Furthermore, the method 600 comprises a step 630 for testing a response of the axial fan. A response tested to the axial fan could be e.g. an acoustic response or a vibration response according to FIG. 4 and FIG. 5.

Figure 7:
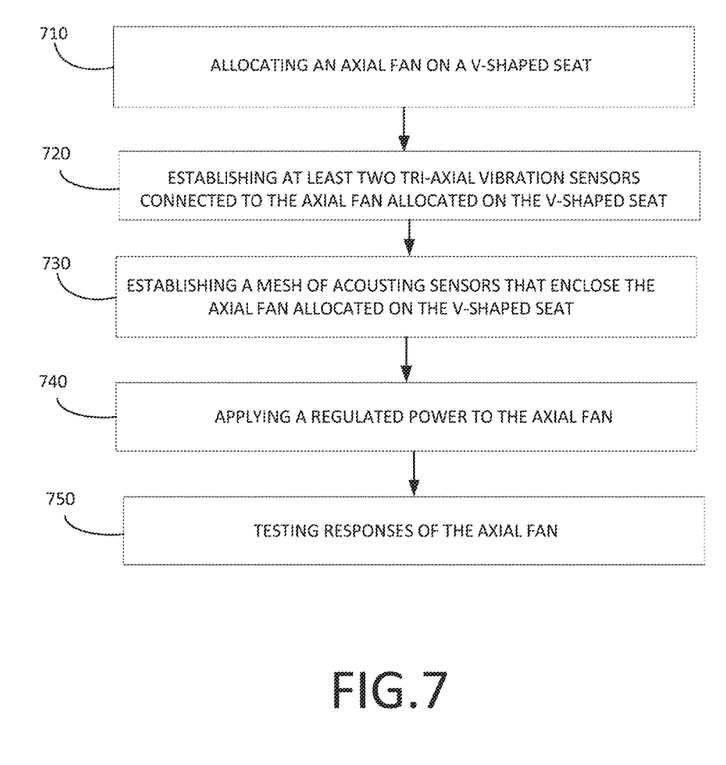
FIG. 7 illustrates a flowchart of another example method for testing an axial fan.

FIG. 7 shows a flowchart of an example method 700 for testing an axial fan. The example method 700 comprises a step 710 for allocating an axial fan on a V-shaped seat, a step 720 for establishing at least at least two tri-axial vibration sensors connected to the axial fan allocated on the V-shaped seat.

The example method 700 comprises a step 730 for establishing a mesh of acoustic sensors that enclose the axial fan allocated on the V-shaped seat.

The example method 700 comprises a step 740 for applying a regulated power to the axial fan. This could be achieve by taking use of the power supply unit 420 and the pulse width modulator 410 unit shown in FIG. 4 and FIG. 5.

The example method 700 comprises a step 750 for testing a response of the axial fan. Testing a response of the axial fan can comprise testing a vibration response related to the at least at least two tri-axial vibration sensors connected to the axial fan allocated on the V-shaped seat. Testing a response of the axial fan can comprise testing an acoustic response related to a mesh of acoustic sensors that enclose the axial fan allocated on the V-shaped seat.

Figure 8:
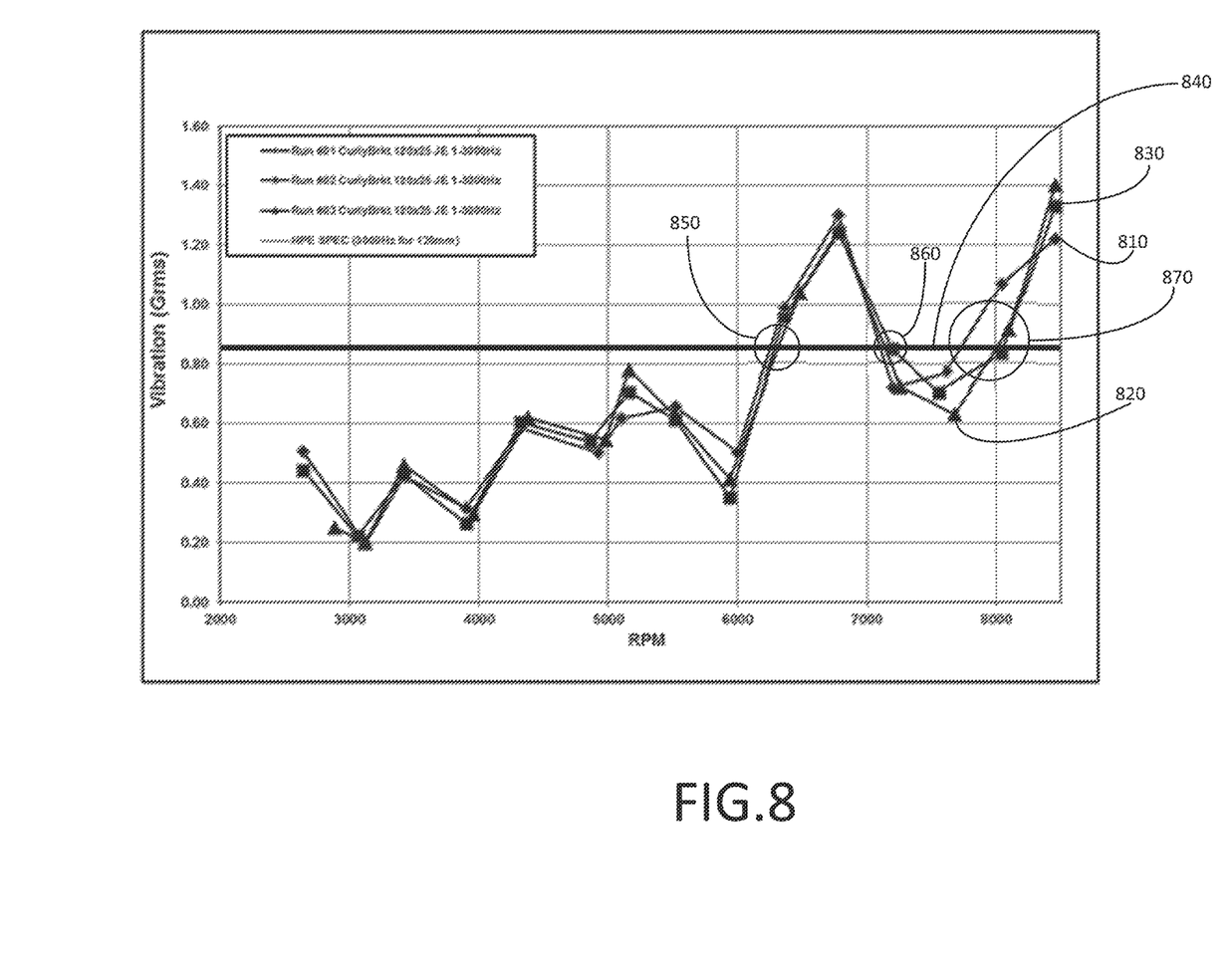
FIG. 8 shows an example graph of three vibration responses of the same axial fan running at different revolutions per minute, RPM.

FIG. 8 shows an example graph of three vibration responses of the same axial fan mounted/unmounted independently three times and running from 2.000 up to 8.000 revolutions per minute, RPM. The graph shows three functions 810, 820 and 830 that represent three independent test runs of the same axial fan independently mounted on the device with a fan size of 120 mm wherein. The fan vibration (in Root Mean Square of Acceleration, Grms units) with respect to a variation of the revolutions per minute, RPM is shown. A first run 810 (plotted with rhombus), a second run 820 (plotted with triangles) and a third run 830 (plotted with squares) show that the system for testing (e.g. system 400 or system 500) can produce data with accuracy and repeatability, including large size fans such as a fan of 120 mm.

The graph of FIG. 8 shows a specification threshold 840 of a conventional storage system that indicates that the vibration in Grms units should not be greater than 0.085 in order to avoid the damaging or harming of the storage system. As it is shown in the graph, vibration response of an axial fan having a size of 120 mm crosses the threshold 840 after running the axial fan at 6200 RPM as shown by reference 850 for the three test runs (810, 820 and 830).

The vibration response of the axial fan crosses the threshold 840 back to safety levels after the speed of the axial fan reaches the 7100 RPM as shown by reference 860 (for the three test runs) and hence, avoiding the damaging of the storage system after that fan speed. The vibration response of the axial fan crosses the threshold 840 again after axial fan reaching the 8000 RPM. Above this fan speed, the vibration considerably passes the specification threshold and the vibration can be too damaging for the storage system.

Figure 9:
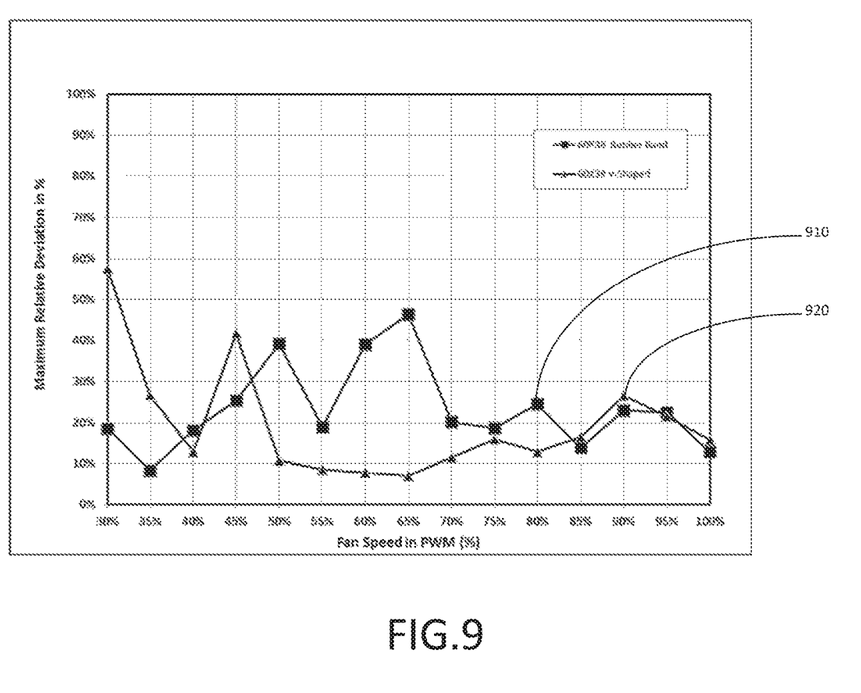
FIG. 9 shows an example graph of a maximum relative deviation of an example V-shaped seat compared to a maximum relative deviation of a rubber band mount.

FIG. 9 shows an example graph of a maximum relative deviation of an example V-shaped seat compared to a maximum relative deviation of a rubber band mount to measure the dispersion of the test values at a predetermined fan speed. A first function 910 plotted with squares represents the maximum relative deviation of a vibration test with respect to regulated fan speed in percentage value using the a rubber band mount. A second function 920 plotted with triangles represent the maximum relative deviation of a vibration test using the proposed V-shaped seat. For example the graph 900 shows that having a fan speed of 50%, the maximum relative deviation of the V-shaped seat is 10% and or the Rubber band mount is 40%.

Figure 10:
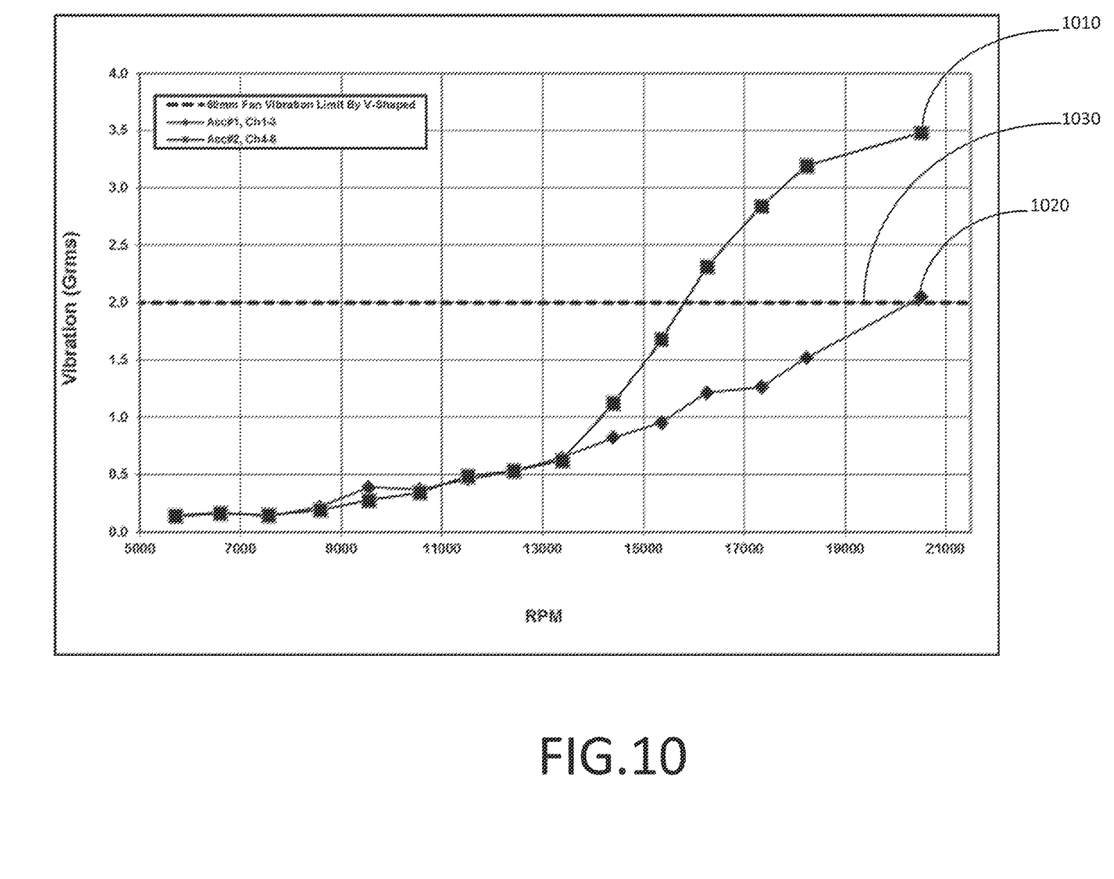
FIG. 10 shows the vibration response of the same axial fan measured by two different sensors applied on the same fan.

FIG. 10 shows the vibration acceleration responses 1010 and 1020 of the same axial fan measured by two different sensors (e.g. a first sensor related to response 1010 and a second sensor related to response 1020) applied on the same fan. In this example, the two vibration sensors are tri-axial vibration sensors as shown in FIG. 4. Two vibration responses in acceleration levels (curves) which were collected on fan body with respect to (vs.) rotation speeds in revolution per minute (RPM). The fan vibration threshold (i.e. straight dotted line 1030) can be defined as the required design specification by cross speeds of fan. The information given by this graph can be useful to system designers to decide the acceptable range of fanAs under use and hence optimize the design of the fan controller in the storage system. For this particular example, the predetermined fan vibration threshold 1030 to avoid damaging of a storage unit/system is 2 Grms units. A first function 1010 shows the vibration response of an axial fan with a size of 60 mm measured by a first vibration sensor. The first vibration sensor crosses the vibration threshold 1030 after 16000 RPM. A second function 1020 shows the vibration response of the same axial fan measured by a second vibration sensor. The second vibration sensor crosses the vibration threshold 1020 after 20500 RPM.

Figure 11:
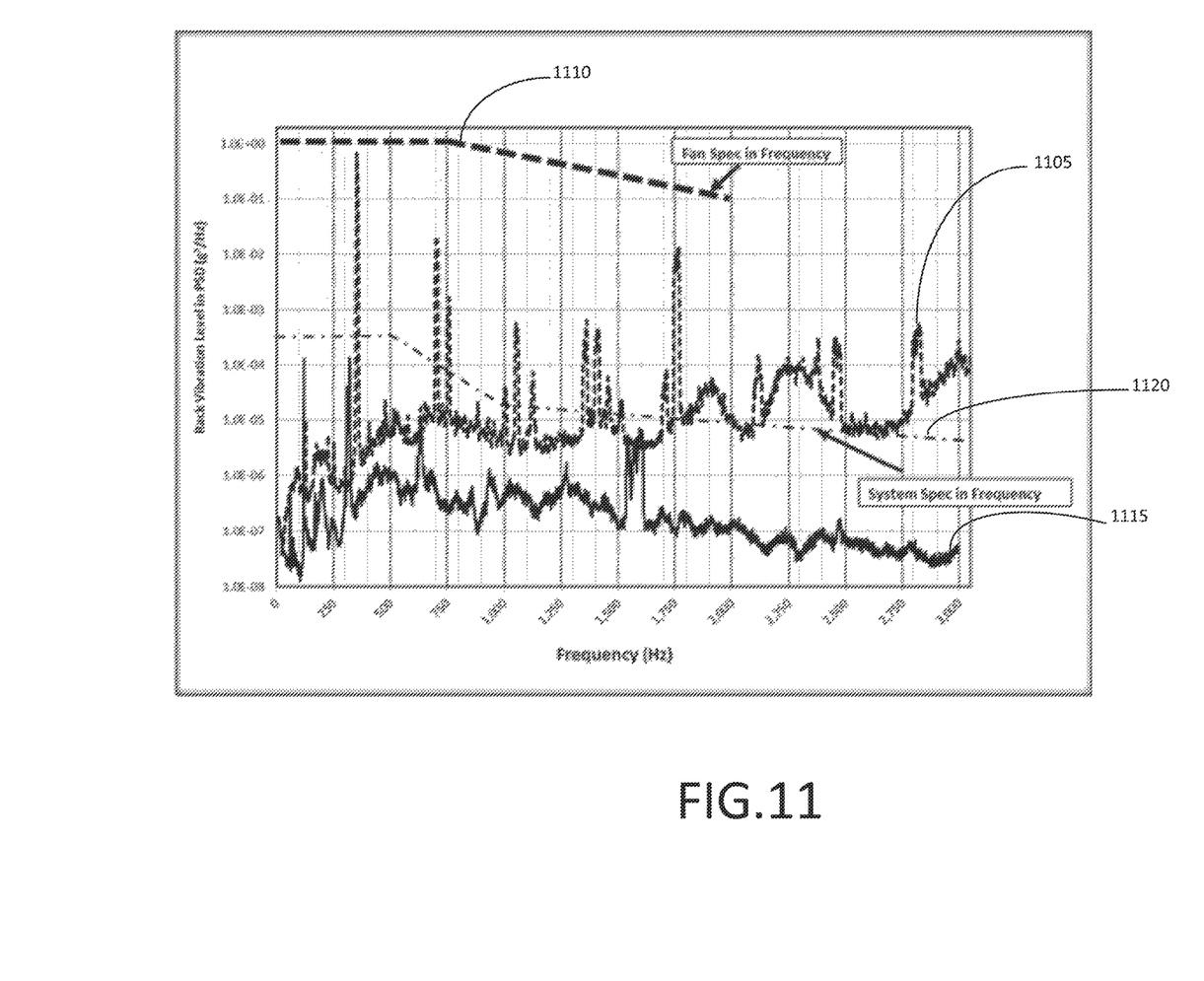
FIG. 11 shows the frequency responses of an axial fan at full power.

FIG. 11 shows two frequency responses 1105 and 1115 of an axial fan at full power (e.g. PWM=100%). Data shows that an axial fan when meeting the fan standalone specification defined by the V-Shaped seat may also meet system vibration specifications of the storage units/servers. The fan specification in frequency 1110 can be defined as a specification for fan standalone vibration. The system specification in frequency 1120 can be defined as a specification to limit responses induced by the installed fan dynamics. The data also shows that system vibration is impacted mainly by fan vibration frequencies at 2000 Hz and below.

Relative terms used to describe the structural features of the figures illustrated herein are in no way limiting to conceivable implementations. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

The invention claimed is:

1. A system for testing an axial fan, the system comprising a V-shaped seat to allocate the axial fan, the V-shaped seat comprising:
   a power supply to provide current to the axial fan;
   a pulse width modulator unit to regulate the current provided to the axial fan;
   at least two tri-axial vibration sensors connected to the axial fan to measure a vibration response of the axial fan allocated on the V-shaped seat;
   a front-end connected to the at least two tri-axial vibration sensors to convert the vibration response to raw data;
   a digital signal analyzer to process and represent the raw data;
   a mesh of acoustic sensors to enclose the axial fan allocated on the V-shaped seat and measure an acoustic response of the axial fan;
   a first surface established on a top side of the V-shaped seat; and a second surface established on the top side of the V-shaped seat,
wherein an intersection between the first surface and the second surface forms a V-shaped surface of 90 degrees to allocate the axial fan on the V-shaped seat,
wherein the V-shaped surface has sticky and resilient properties to fix the axial fan on the V-shaped surface, and
wherein the V-shaped seat comprises a gap established on the intersection between the first surface and the second surface to receive a part of the volume of the axial fan.

2. The system of claim 1, wherein the mesh of acoustic sensors is connected to the front-end to convert the acoustic response of the axial fan to raw data.

3. The system of claim 2, wherein the digital signal analyzer processes and represents the raw data associated with the acoustic response.

4. The system of claim 1, wherein the mesh of acoustics sensors is a mesh of ultra-high sensitive microphones.

5. The system of claim 1, further comprising at least two spring loaded clamps to grip the axial fan.

6. A method comprising:
allocating an axial fan on a V-shaped seat, the V-shaped seat comprising a first surface established on a top side of the V-shaped seat and a second surface established on the top side of the V-shaped seat,
wherein an intersection between the first surface and the second surface forms a V-shaped surface of 90 degrees to allocate the axial fan on the V-shaped seat, and
wherein the V-shaped surface has sticky and resilient properties to fix the axial fan on the V-shaped surface;
applying a regulated power to the axial fan; and
testing a response of the axial fan, wherein testing a response of the axial fan comprises establishing a front-end connected to measurement sensors to obtain raw data, wherein the measurement sensors are a mesh of acoustic sensors that enclose the axial fan allocated on the V-shaped seat, and establishing a digital signal analyzer to process and represent the raw data.

7. The method of claim 6, further comprising establishing a gap on the intersection between the first surface and the second surface to receive a part of the volume of the axial fan.

8. The method of claim 6, wherein testing a response of the axial fan comprises establishing measurement sensors to measure the response of the axial fan.

9. The method of claim 6, wherein applying a regulated power to the axial fan comprises establishing:
a power supply unit to provide current to the axial fan; and
a pulse width modulator unit to regulate the current provided to the axial fan.

10. The method of claim 6, wherein testing a response of the axial fan comprises establishing a front-end connected to the measurement sensors to obtain raw data.

11. The method of claim 6, wherein the measurement sensors are at least two tri-axial vibration sensors connected to the axial fan allocated on the V-shaped seat.

* * * * *